US011636450B2

(12) United States Patent
Kim et al.

(10) Patent No.: US 11,636,450 B2
(45) Date of Patent: Apr. 25, 2023

(54) BLOCKCHAIN SYSTEM TO WHICH PROOF-OF-TRANSACTION CONSENSUS ALGORITHM IS APPLIED, AND METHOD THEREFOR

(71) Applicant: BLOCKCHAIN LABS INC., Seoul (KR)

(72) Inventors: Yong Tae Kim, Seoul (KR); Byung Wan Lim, Seoul (KR)

(73) Assignee: BLOCKCHAIN LABS INC., Seoul (KR)

( * ) Notice: Subject to any disclaimer, the term of this patent is extended or adjusted under 35 U.S.C. 154(b) by 223 days.

(21) Appl. No.: 17/040,724

(22) PCT Filed: Jul. 27, 2018

(86) PCT No.: PCT/KR2018/008504
§ 371 (c)(1),
(2) Date: Sep. 23, 2020

(87) PCT Pub. No.: WO2019/182202
PCT Pub. Date: Sep. 26, 2019

(65) Prior Publication Data
US 2021/0004777 A1 Jan. 7, 2021

Related U.S. Application Data

(60) Provisional application No. 62/646,930, filed on Mar. 23, 2018.

(30) Foreign Application Priority Data

Jun. 5, 2018 (KR) ........................ 10-2018-0064925

(51) Int. Cl.
*G06Q 20/00* (2012.01)
*G06Q 20/08* (2012.01)
(Continued)

(52) U.S. Cl.
CPC ....... *G06Q 20/085* (2013.01); *G06F 16/2379* (2019.01); *G06F 21/64* (2013.01);
(Continued)

(58) Field of Classification Search
CPC .......... G06Q 20/085; G06Q 20/38215; G06Q 20/3825; G06Q 20/3829; G06Q 30/0185;
(Continued)

(56) References Cited

U.S. PATENT DOCUMENTS 9,182,891 B2 11/2015 Adarraga
10,120,547 B2 11/2018 Adarraga
(Continued)

FOREIGN PATENT DOCUMENTS

| JP | 2014534500 | 12/2014 |
| KR | 10-1628009 | 6/2016 |

(Continued)

OTHER PUBLICATIONS

Li, Kejiao et al., Proof of Vote: A High-Performance Consensus Protocol Based on Vote Mechanism & Consortium Blockchain, Conference Paper—Dec. 2017, ResearchGate.
(Continued)

*Primary Examiner* — Dante Ravetti
(74) *Attorney, Agent, or Firm* — Guntin & Gust, PLC; Miyoung Shin

(57) ABSTRACT

A blockchain system is disclosed. A blockchain system according to one embodiment includes a plurality of nodes for communicating with each other through a distribution network and communicating with a blockchain client device outside the blockchain system, wherein each of the plurality of nodes can be configured to process transactions occurring in the blockchain system, collect vote items included in the transactions and including an account address corresponding to any one of the plurality of nodes, and elect, as a block
(Continued)

BLOCKCHAIN NETWORK SYSTEM (10)

TRX PROCESSING →
← TRX GENERATION

CLIENT(50)

generator, at least one of the plurality of nodes on the basis of the collected vote items. Other various embodiments identified through the specification are possible.

16 Claims, 9 Drawing Sheets

(51) Int. Cl.
*G06Q 30/018* (2023.01)
*G06Q 20/38* (2012.01)
*G06Q 40/04* (2012.01)
*G06F 16/23* (2019.01)
*G06F 21/64* (2013.01)

(52) U.S. Cl.
CPC ..... *G06Q 20/3825* (2013.01); *G06Q 20/3829* (2013.01); *G06Q 20/38215* (2013.01); *G06Q 30/0185* (2013.01); *G06Q 40/04* (2013.01); *G06Q 2220/00* (2013.01); *G06Q 2230/00* (2013.01)

(58) Field of Classification Search
CPC ............... G06Q 40/04; G06Q 2220/00; G06Q 2230/00; G06Q 20/40; G06Q 20/382; G06F 16/2379; G06F 21/64; G06F 11/18; H04L 67/1093
USPC ................................ 705/16, 21; 380/44, 262
See application file for complete search history.

(56) References Cited

U.S. PATENT DOCUMENTS

| | | |
|---|---|---|
| 10,164,779 B2 | 12/2018 | Uhr et al. |
| 10,545,642 B2 | 1/2020 | Adarraga |
| 10,679,193 B2 | 6/2020 | Uhr et al. |
| 2013/0097245 A1 | 4/2013 | Adarraga |
| 2013/0097513 A1 | 4/2013 | Adarraga |
| 2016/0103588 A1 | 4/2016 | Adarraga |
| 2020/0233563 A1 | 7/2020 | Adarraga |
| 2020/0334674 A1* | 10/2020 | Youngblood ............. H04L 9/50 |

FOREIGN PATENT DOCUMENTS

| | | |
|---|---|---|
| KR | 10-1680260 | 11/2016 |
| KR | 10-1701131 | 2/2017 |
| KR | 10-1773074 | 8/2017 |
| KR | 10-1837169 | 3/2018 |

OTHER PUBLICATIONS

BookchainIO/EOS-DOCS, EOS.IO Technical White Paper, pp. 1-27, block.one, Jun. 26, 2017, available at https://github.com/blockchainio/eos-docs/blob/master/TechnicalWhitePaper.md.

Office Action issued in corresponding KR Application No. 10-2018-0064925, dated Oct. 5, 2020.

International Search Report for International Application PCT/KR2018/008504, dated Dec. 20, 2018.

Bezalel Lim, et al., Yosemite Public Blockchain. Yosemite X Inc. Feb. 2018.

Notice of Allowance issued to corresponding Korean Application 1020210000951, dated Apr. 7, 2021.

* cited by examiner

BLOCKCHAIN SYSTEM TO WHICH PROOF-OF-TRANSACTION CONSENSUS ALGORITHM IS APPLIED, AND METHOD THEREFOR

CROSS REFERENCE TO RELATED APPLICATIONS AND PRIORITY

This application is a U.S. national phase application of International Application No. PCT/KR2018/008504, filed on Jul. 27, 2018, which claims priority to and the benefit of Korean Patent Application No. 10-2018-0064925, filed on Jun. 5, 2018, and U.S. Provisional Application No. 62/646,930, filed on Mar. 23, 2018. The disclosures of the above applications are incorporated herein by reference in their entireties.

TECHNICAL FIELD

Embodiments disclosed herein relate to a consensus algorithm applied to a blockchain network system.

BACKGROUND ART

In a network system such as a distributed network which is composed of a plurality of nodes, there is a difference in time at which information is reached between the plurality of nodes included in the network. A consensus algorithm may be understood as an algorithm for obtaining consensus on one result by nodes participating in a network.

A blockchain network system (hereinafter, a blockchain system) is a distributed network (P2P network) system. For the reliability of the blockchain system, a consensus algorithm is required because all nodes in the network should determine the same result value. For example, consensus algorithms of a proof of work manner, a proof of stake manner, and a delegated proof of stake manner are currently used.

In addition, even when some of the plurality of nodes included in the blockchain system are malicious nodes, there may be a problem with network reliability. The Byzantine general problem is a problem of modeling a situation in which a malicious node participates in a distributed network system. The Byzantine Fault Tolerance (BFT) algorithm may be understood as an algorithm which solves the above Byzantine general problem and ensures reliability even when a malicious node is present in a distributed network system. When the total number of block producers is $N=3f+1$ in the BFT algorithm, only up to f Byzantine nodes may be allowed.

DISCLOSURE OF THE INVENTION

Technical Problem

A typical consensus algorithm poses various problems. In the present document, disclosed is a blockchain system applied with a consensus algorithm of a new manner which solves limitations of the typical consensus algorithm. The consensus algorithm of a new manner may derive consensus between nodes of a blockchain system based on a transaction generating in the blockchain system.

Technical Solution

A blockchain system according to an embodiment disclosed herein includes a plurality of nodes communicating with each other through a distributed network and communicating with a blockchain client device outside the blockchain system, wherein each of the plurality of nodes may be set to process a transaction generated on the blockchain system, collect a voting item included in the transaction and including an account address of any one node among the plurality of nodes, and elect at least one node among the plurality of nodes as a block producer based on the collected voting items.

Also, a method according to an embodiment disclosed herein and performed by at least one node among a plurality of nodes included in a blockchain system and communicating with each other through a distributed network of the blockchain system, includes collecting voting items included in a plurality of transactions generated on the blockchain system, wherein each of the voting items includes an account address corresponding to any one node among the plurality of nodes, and electing a predetermined number of block producers based on the collected voting items.

Advantageous Effects

According to embodiments disclosed herein, a node may be elected as a block producer by a transaction vote, the node directly contributing to the economic benefit of a blockchain system. In addition, since a voting procedure is performed when a transaction is processed, a separate voting procedure is not required, so that a voting rate may be increased and user convenience may be achieved.

In addition, a blockchain system according to the embodiments disclosed herein may have short block time and fast block finality compared to a typical blockchain system.

In addition, various effects may be provided which are directly or indirectly identified through the document.

BRIEF DESCRIPTION OF THE DRAWINGS

With respect to the description of the drawings, the same or similar reference numerals may be used for the same or similar components.

MODE FOR CARRYING OUT THE INVENTION

Hereinafter, various embodiments of the present invention will be described with reference to the accompanying drawings. However, it should be understood that the present invention is not limited to a particular embodiment, but includes various modifications, equivalents, and/or alternatives of embodiments of the present invention.

Figure 1:
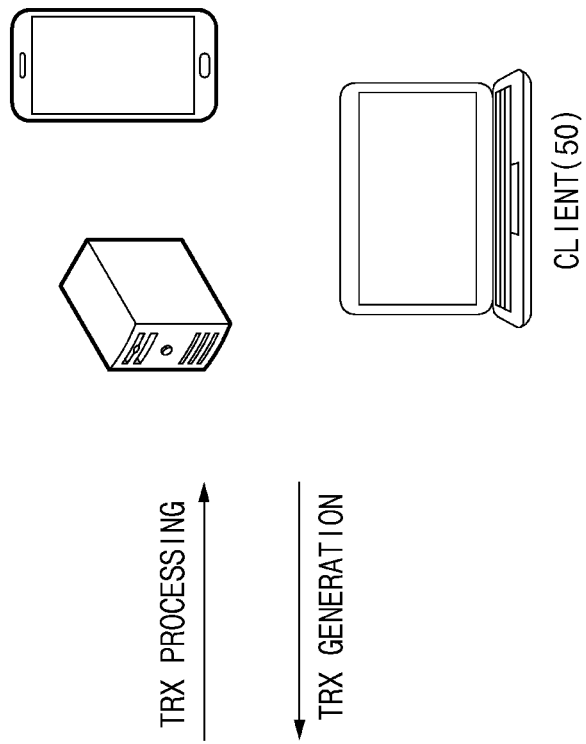
FIG. 1 illustrates an operating environment of a blockchain network system according to an embodiment.
Figure 1:
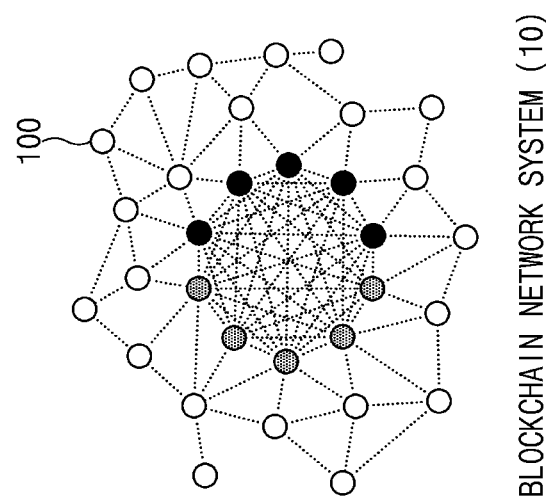

FIG. 1 illustrates an operating environment of a block chain network system according to an embodiment.

Referring to FIG. 1, a blockchain network system 10 (hereinafter, a blockchain system) may be understood as a distributed network or a P2P network including a plurality of nodes 100 connected to each other through a network. Each node 100 may be referred to as a computing device. Each node 100 may process a transaction when a transaction is generated and store information associated with the processed transaction in one database (hereinafter, a transaction database). When a transaction is generated, the blockchain system 10 may execute a transaction after going through a consensus process with respect to the transaction based on a consensus algorithm implemented in the blockchain system 10.

The executed transaction may be recorded in the transaction database. The transaction database may have a blockchain structure. The transaction database may be understood as a public ledger of a plurality of nodes.

A specific node elected as a block producer among the plurality of nodes 100 of the blockchain system 10 may generate a new block. The block producer may receive compensation (block compensation) given when generating a new block. A block newly generated by the block producer may be propagated to other nodes 100.

The blockchain system 10 may execute various application services provided by various service providers. Software implemented for providing an application service may be distributed to the blockchain system 10 by the service providers. The blockchain system 10 may drive the distributed software and process a transaction generated according to the driving of the software. The transaction may be generated by a client 50 using a corresponding application service. The client 50 may identify a processing result of the transaction through a blockchain.

For example, the client 50 may be various forms of devices. The client 50 may include, for example, a portable communication device (for example, a smart phone), a computer device, a portable multimedia device, a portable medical device, a camera, a wearable device, or a home appliance device.

In one embodiment, a transaction generated in the blockchain system 10 may include a voting item for electing a block producer. The voting item may include an account address. If a voting item of a transaction includes an account address, the corresponding transaction may be acknowledged as a vote for the corresponding account address. Hereinafter, a vote made by a transaction may be described as a 'transaction vote.' A node which has won many votes by transactions executed in the blockchain system 10 may be elected as block producers.

Figure 2A:
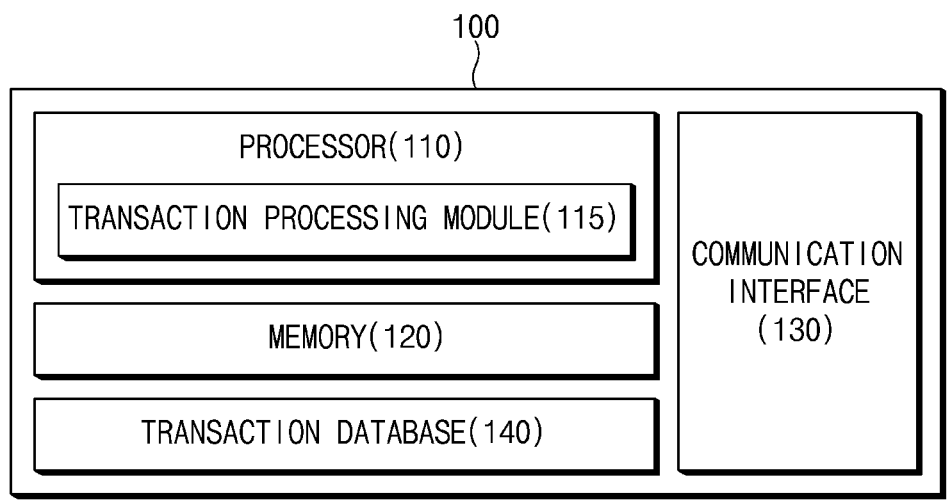
FIG. 2A is a device block diagram of a node included in a blockchain system according to an embodiment.
Figure 2B:
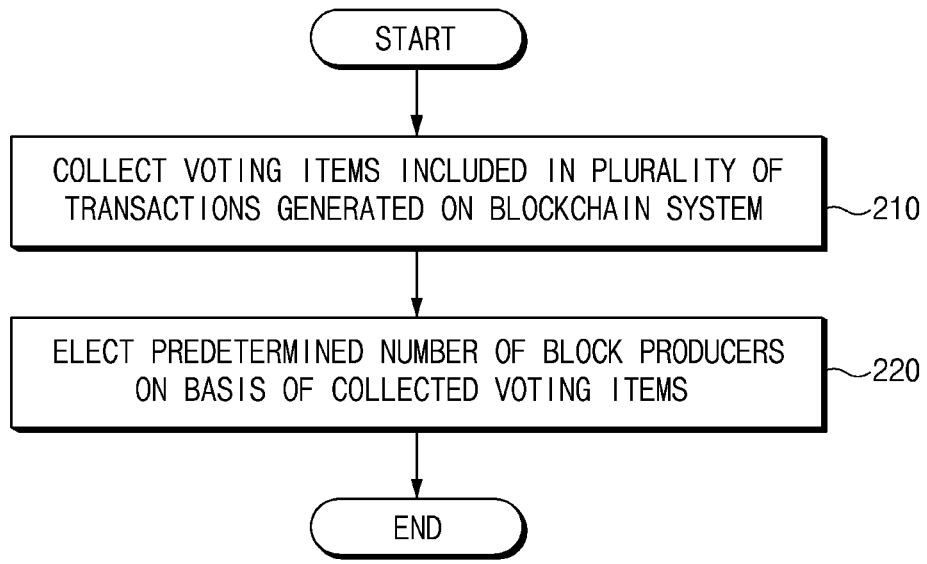
FIG. 2B is a flowchart of a method for electing a block producer according to an embodiment.

FIG. 2A is a device block diagram of a node included in a blockchain system according to an embodiment. FIG. 2B is a flowchart of a method for electing a block producer according to an embodiment.

The block diagram illustrated in FIG. 2A may be understood as a block diagram of any one of the plurality of nodes 100 included in the blockchain system 10. Each of the nodes 100 included in the blockchain system 10 may be referred to as a computing device. A node 100 may include a processor 110, a memory 120, a communication interface 130, and a transaction database 140.

The processor 110 may control the overall operation of the node 100. The processor 110 may include a transaction processing module 115. For example, the processor 110 may execute instructions stored in the memory 120 to drive the transaction processing module 115. An operation performed by the transaction processing module 115 may be understood as an operation performed by the processor 110.

The node 100 may communicate with the plurality of nodes 100 included in the blockchain system 10 through the communication interface 130. The processor 110 of the node 100 processes a generated transaction, and may propagate the transaction or a processing result of the transaction to a plurality of other nodes 100 included in the blockchain system 10 through the communication interface 230. The plurality of nodes 100 may store information on the processed transaction in each transaction database 140.

Referring to FIG. 2B, a method for electing a block producer according to an embodiment may include Operation 210 to Operation 220. Operations 210 to 220 may be, for example, performed or executed by at least one node 100 included in the blockchain system 10. Operation 210 to Operation 220 may be, for example, implemented as instructions which may be performed (or executed) by the processor 110 of the node 100. The instructions may be, for example, stored in a computer recording medium or in the memory 120 of node 100 illustrated in FIG. 2A.

In Operation 210, the node 100 may collect voting items included in a plurality of transactions generated on the blockchain system 10. A transaction generated on the blockchain system 10 may optionally include a voting item. The voting item may include an account address of the node 100 which the client 50 who has generated the transaction hopes to be elected as a block producer. When processing a transaction, the transaction including a voting item, the node 100 may collect the voting item.

For example, when a voting item includes a specific account address, the node 100 may acknowledge the corresponding voting item as one vote for the specific account address. As a plurality of transactions are generated and processed, voting items collected may accumulate.

In Operation 220, the node 100 may elect a predetermined number of block producers based on the collected voting items. The node 100 may select at least one node which has won many votes as a block producer based on the collected and accumulated voting items. The number of block producers may be limited. For example, the number of block producers to be elected may be predetermined on the blockchain system 10.

Operations performed by the blockchain system 10 to be described below may be performed or executed by at least one node 100 included in the blockchain system 10. The at least one node 100 included in the blockchain system 10 may be elected as a block producer, and the at least one node 100 elected as a block producer may generate a block and receive an incentive therefor.

Figure 3A:
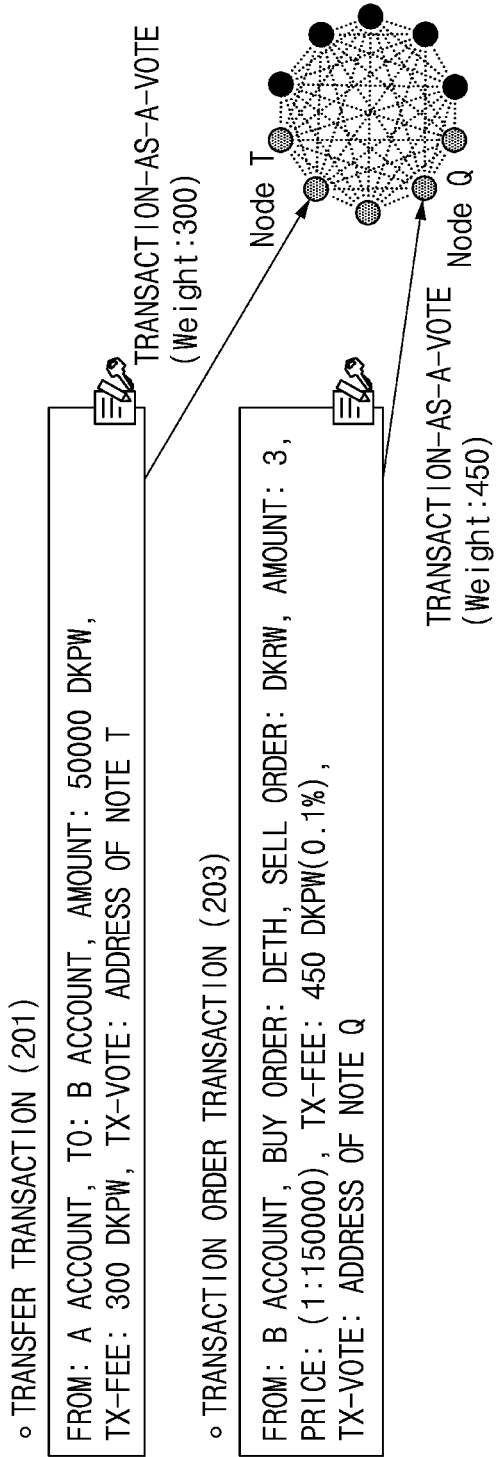
FIG. 3A illustrates an example of a transaction generated in a blockchain system according to an embodiment.
Figure 3B:
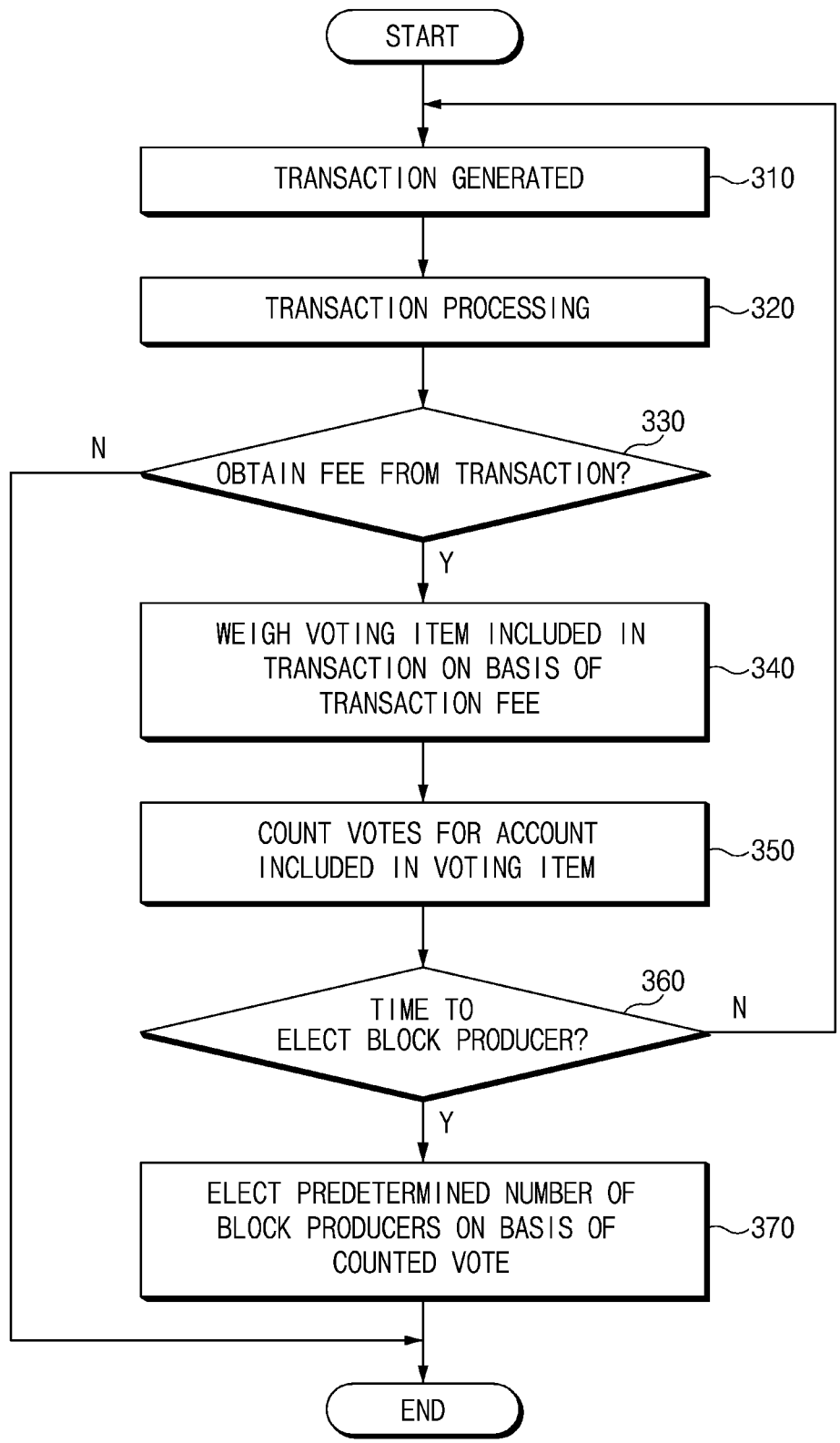
FIG. 3B is a flowchart of a method for counting votes and electing a block producer on the basis of a transaction according to an embodiment.

FIG. 3A illustrates an example of a transaction generated in a blockchain system according to an embodiment. FIG. 3B is a flowchart of a method for counting votes and electing a block producer on the basis of a transaction according to an embodiment.

Referring to FIG. 3A, a transaction may include a voting item (tx-vote). When a voting item is included in a transaction, it may be understood to mean that a subject generating the transaction wants a node described in the transaction voting item to be elected as a block producer. For example, voting by a transaction may be voting having a meaning of wanting a blockchain core node which owns a blockchain account address described in a voting item be elected as a block producer. Blockchain transactions including a vote for a block producer are cryptographically signed by a private key of a blockchain account of a subject which has generated the corresponding transactions, so that cryptographic proof data which may not be forged may be recorded on the blockchain system 10 for all votes related to the election of the block producer.

Referring to FIG. 3A, transactions 201 and 203 include a voting item (Tx-vote). A transfer transaction 201 includes the address of a node T in a Tx-voting item, and thus, may be understood as a transaction voted with the node T. An exchange order transaction 203 includes the address of a node Q in the Tx-voting item, and thus, may be understood as a transaction voted with the node Q. Although not illustrated, each of the transactions 201 and 203 may be cryptographically signed by an account of a transaction generator (for example: the client 50).

Blockchain nodes winning many transaction votes which are submitted to the blockchain system 10 and collected from the normally processed transactions 201 and 203 may be elected as a block producer of the blockchain system 10. The elected block producer is to collaborate with other block producers of a blockchain consensus protocol generating a new block, and receive a reward for creating the new block.

In one embodiment, a voting item may optionally be included only in transactions incurring a transaction fee. Alternatively, only a voting item included in a transaction incurring a transaction fee may be collected as a valid vote. Only a vote of a transaction which provides economic benefit to the blockchain system 10 through a transaction fee may be counted as a valid vote.

For example, the transfer transaction 201 and the exchange order transaction 203 include a transaction fee item (Tx-fee). A transaction which does not include a fee item, or is described as having no fee in a fee item may not be counted as a transaction vote.

In one embodiment, a voting item of a transaction may be weighted in proportion to a transaction fee. According to the degree of contribution to the economic benefit of the blockchain system 10, a transaction vote may be weighted.

Since the transfer transaction 201 is a transaction incurring a transaction fee of 300 dKPW, a voting item of the transfer transaction 201 may be weighted by 300. Therefore, the voting item of the transfer transaction 201 may be understood as a transaction vote weighted by 300 for the node T. Since the exchange order transaction 203 is a transaction incurring a transaction fee of 450 dKPW, a voting item of the exchange order transaction 203 may be weighted by 450. Therefore, the voting item of the exchange order transaction 203 may be understood as a transaction vote weighted by 450 for the node Q.

In one embodiment, a vote included in transaction may be collected as a vote valid when a transaction fee is collected. Depending on the type and function of a transaction, the time at which a transaction fee is collected may vary. The blockchain system 10 may count a vote included in a transaction as a valid vote based on when a transaction fee is collected.

For example, if the exchange order transaction 203 is a sell order for a token exchange transaction, a vote included in the exchange order transaction 203 may be counted as a valid vote for the node Q when a transaction for a buy order matching the price of the sell order is made. If a trading by the exchange order transaction 203 is not made and canceled by a user, a vote included in the exchange order transaction 203 may be invalid. The blockchain system 10 may collect, as a valid vote, a vote included in transactions providing revenue to the blockchain system 10 by incurring a transaction fee. Meanwhile, a collected transaction fee may be used as an incentive to be provided to blockchain operators such as a block producer.

In general, voting processes for blockchain governance, distribution of cryptocurrency revenue, and the like implemented in other blockchain systems are designed by using a method in which users of a block chain system should generate a separate block chain transaction to participate in voting. However, it is very difficult to expect that blockchain users to spend extra time and money on generating a separate transaction and actively participate in voting. In particular, if a transaction fee is incurred when generating a transaction for voting, it is more difficult to expect users to participate. Therefore, voter turnout rates of blockchain systems which allow blockchain governance to operate through a separate voting process is generally quite low.

For example, in an EOS blockchain system, in order to elect block producers, EOS cryptocurrency owners should participate in a voting process apart from using a typical EOS-based blockchain service (Dpos method).

For another example, in a Stellar blockchain system, a separate voting is held on which blockchain account is to take Lumens cryptocurrency (which is newly issued by inflation) generated every block by a blockchain itself. Lumen cryptocurrency issued by inflation is not immediately paid to a block producer. Lumens cryptocurrency owners should participate in the above separate voting process.

On the other hand, in the blockchain system 10 according to the present invention, a voting function is integrated in a transaction generated on a blockchain, so that blockchain users do not have to participate in a separate voting process, and voting is automatically held when the blockchain system 10 is used. Therefore, a voting rate is very high.

Referring to FIG. 3B, when a transaction is generated in Operation 310, at least one node 100 of the blockchain system 10 may process the transaction in Operation 320. When processing a transaction, the blockchain system 10 may collect a voting item included in the transaction. A process of collecting a transaction may be, for example, performed as Operation 330 to Operation 370. The order of Operation 330 to Operation 370 is described as an example, and each operation may be performed substantially simultaneously, and some operations may be omitted depending on implemented characteristics.

In Operation 330, the blockchain system 10 may identify whether it is possible to obtain a fee from a transaction which has been processed or is to be processed. For example, the blockchain system 10 may be designed to collect only a voting item of a transaction which may pay a fee and contribute to the economy of the blockchain system 10. If it is not a transaction paying a fee, the blockchain system 10 may process the generated transaction and terminate a process associated with the transaction.

If it is a transaction pays a fee, in Operation 340, the blockchain system 10 may weight a voting item included in the transaction based on a transaction fee. As described above, a transaction voting item may be weighted in proportion to a transaction fee. In addition, in Operation 350, the blockchain system 10 may collect votes for an account address included in a voting item. For example, the blockchain system 10 may count the number of votes for an account address included in a transaction vote.

For example, when the blockchain system 10 does not take a transaction fee into consideration, a voting item included in one transaction may be acknowledged as one vote. When the blockchain system 10 does take a transaction fee into consideration, even if it is a voting item included in one transaction, the voting item may be acknowledged as the number of votes weighted corresponding to the transaction fee. For example, in FIG. 3A, a transaction vote by the transfer transaction 201 may be acknowledged as 300 votes for T, and a transaction vote by the exchange order transaction 203 may be acknowledged as 450 votes for Q.

Operation 310 to Operation 350 may be repeatedly performed until the time to elect a block producer. A block producer may be, for example, elected at regular intervals. A block producer may be elected based on transaction votes generated during one interval. The blockchain system 10 may check whether it is time to elect a block producer in Operation 360, and when the time to elect a block producer is not reached, may collect transaction votes from continuously generated transactions (Operation 310 to Operation 350).

When it is time to elect a block producer, the blockchain system 10 may elect a predetermined number of block producers based on the transaction votes collected in Operation 370. For example, the blockchain system 10 may sort account addresses in order of winning the largest number of votes, and may elect a predetermined number of block producers ranked at the top among the account addresses.

Figure 4:
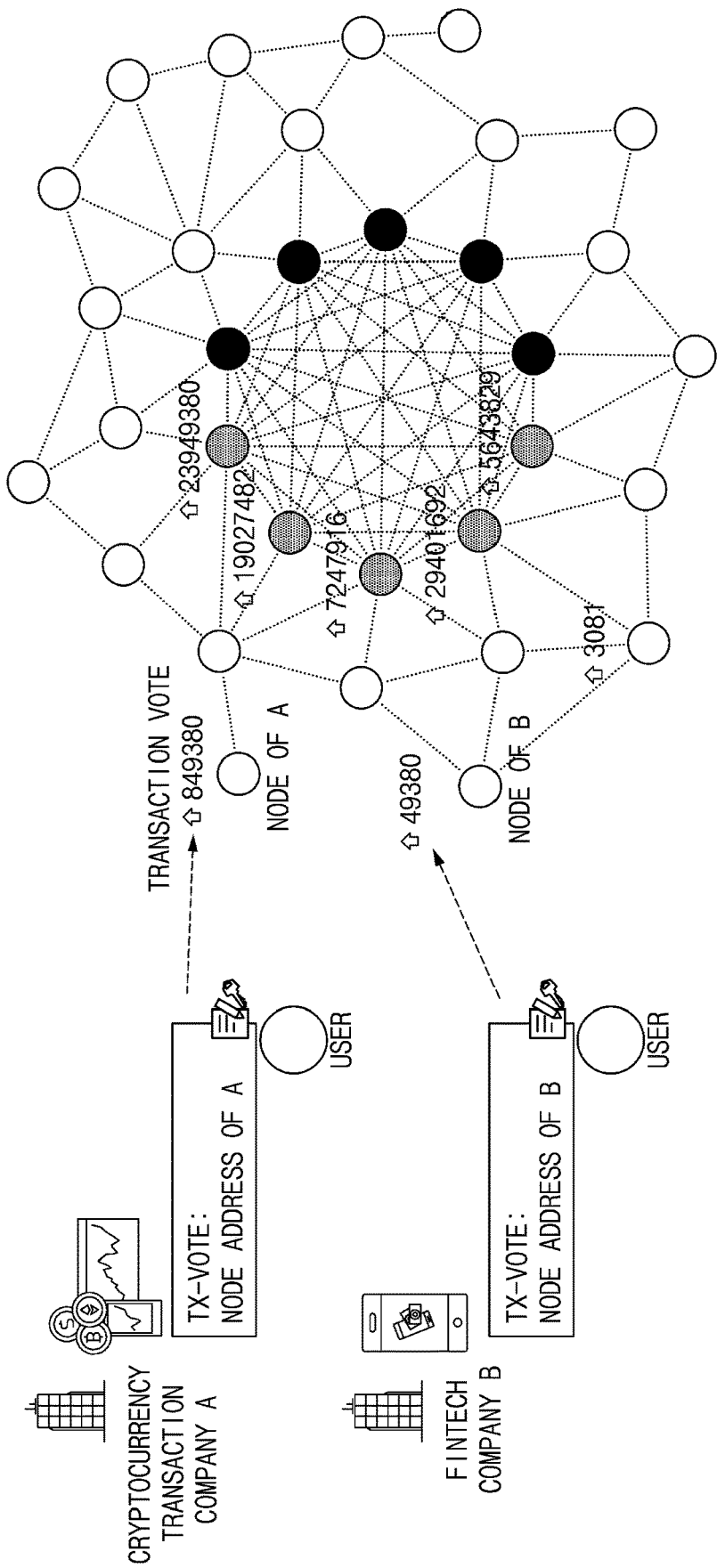
FIG. 4 represents a blockchain system capable of providing incentives for blockchain-based service providers according to an embodiment.

FIG. 4 represents a blockchain system capable of providing incentives for blockchain-based service providers according to an embodiment.

As described above, as transactions are generated and processed on the blockchain system 10, transaction votes for each blockchain node may be accumulated. The blockchain system 10 may elect block producers based on the amount of accumulated transaction votes.

The amount of accumulated transaction votes may be a very accurate and meaningful measure of how many transactions a subject that owns a corresponding blockchain account has generated and activated the economy of the blockchain system 10.

For example, a blockchain system based on a proof of work (PoW) manner provides an incentive to subjects with hash power which may be obtained from a huge amount of computer operation. However, such hash power does not make any special contribution to a blockchain system itself other than being used for competition to select an account for generating a block. In a blockchain system of PoW, electricity on an astronomical scale is consumed to generate hash power.

Meanwhile, a blockchain system based on the Proof of Stake (PoS) manner provides an incentive to subjects who own a large amount of native cryptocurrency of the corresponding blockchain system. A validator or block producers who already own a large amount of cryptocurrency are more likely to be elected as a node for generating a new block during a consensus process of a blockchain system. In addition, a node which has generated a block receives a newly issued cryptocurrency which is given as compensation when generating a new block. In the end, the PoS manner may be viewed as a rich-get-richer system in which nodes with a large amount of existing cryptocurrency receive more compensation (cryptocurrency).

Even when blockchain consensus methods based on the PoW method and PoS method do not make a direct contribution to the generation of transactions, which is an economic activity generated on a blockchain system, nodes with gained power (hash power generation through hardware facilities, cryptocurrency) may receive an incentive. On the other hand, a consensus method of the proof-of-transaction (PoT) manner of the blockchain system 10 according to the present invention may provide an incentive to nodes generating revenue by transaction fees on the blockchain system 10 and making a direct contribution on the economy of the blockchain system 10.

In one embodiment, a transaction may be generated by software distributed on the blockchain system 10. A voting item included in the transaction may be encoded by the software. The transaction should always be cryptographically signed with a private key of a user account, but is not to be generated by a user directly. For example, software developed to provide first service based on the blockchain system 10 may be developed to encode an account address of a node (a core node of a blockchain system) operated by a service provider of the first service in a voting item of a transaction generated by the first service. As such, software developed for a specific application service to be serviced to a user of the blockchain system 10 encodes a voting item into its own account address on behalf of the user. As a result, service providers that generate many meaningful transactions may be elected as a block producer, thereby obtaining an incentive for the blockchain system 10.

For example, referring to FIG. 4, trading software of a cryptocurrency exchange company A providing exchange service based on the blockchain system 10 may generate a transaction for token exchange buy/sell orders of users. All transactions encoded by the software of the exchange company A may include a blockchain account address of a core node operated by the exchange company A in a voting item (Tx-vote). In addition, a transaction cryptographically signed with a blockchain cryptographic key provided by a user may be submitted to the blockchain system 10. As the transaction amount of the exchange service of the exchange company A increases, a blockchain node of the exchange company A may win a large amount of transaction votes, be elected as a block producer of the blockchain system 10, and receive compensation. A Fintech company B providing Fintech service based on the blockchain system 10 may similarly implement and deploy software for providing Fintech service.

Service providers of the blockchain system 10 will make efforts to provide high quality service to blockchain users to win a larger amount of transaction votes, and will compete with each other in a transparent and fair manner.

Figure 5:
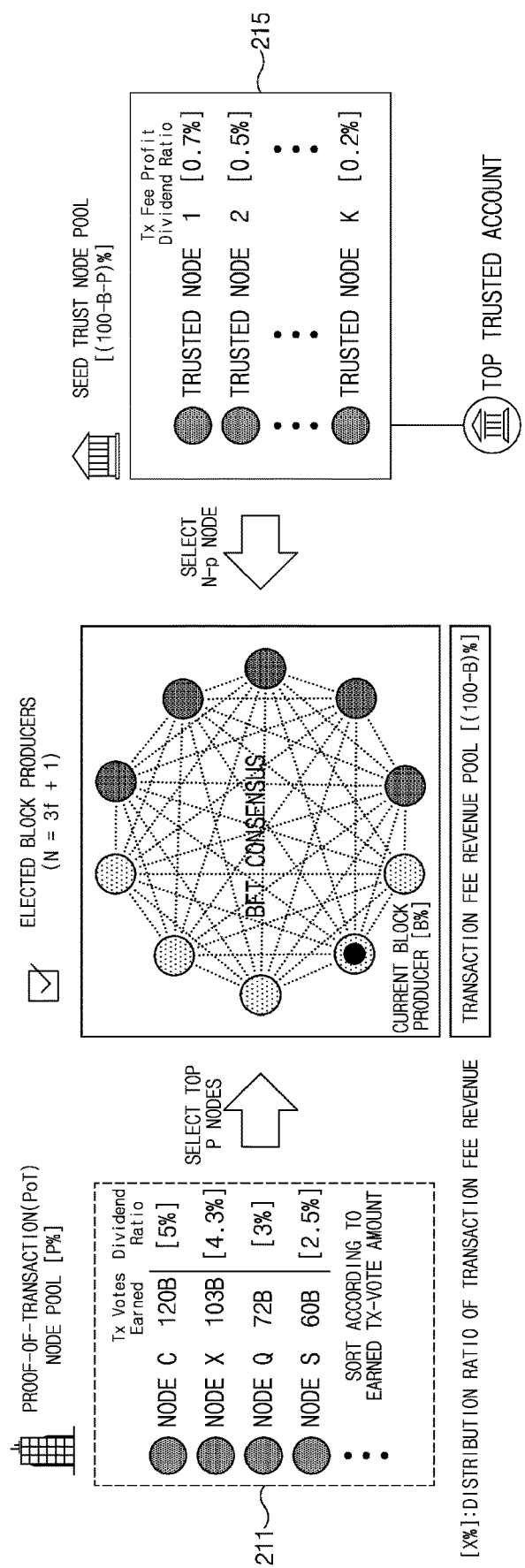
FIG. 5 is a view for describing an example of operating a node pool for block producer candidates according to an embodiment.

FIG. 5 is a view for describing an example of operating a node pool for block producer candidates according to an embodiment.

In one embodiment, the blockchain system 10 may be implemented as a public blockchain. In this case, any node may be elected as a block producer as long as it may provide useful service to blockchain users and win a transaction vote.

Proof-of-Transaction (PoT) Node Pool

Nodes which have won a large amount of transaction votes may become a block producer candidate who is likely to be elected as a block producer. In one example, a block producer candidate may be registered in a node pool based on proof of transaction (PoT node pool) 211. For example, when blockchain account addresses owned by blockchain core nodes operated by service providers win a large amount of transaction votes, the blockchain account addresses may be registered in the PoT node pool 211 according to the order of the amount of votes.

An amount of transaction votes to be won by each blockchain account may be calculated by block producers elected in the blockchain system 10 through, for example, a blockchain consensus protocol based on Byzantine Fault Tolerant (BFT). Therefore, the amount of transaction votes may be calculated in a transparent manner with high security.

In one embodiment, the number of blockchain accounts which may be included in the PoT node pool 211 may be limited. For example, an account which has won a very small amount of transaction votes may not be registered in the PoT node pool 211, and only accounts which have won transaction votes of a certain amount or above may be registered in the PoT node pool 211.

For example, an amount of transaction votes may be calculated for every block. Accounts of the blockchain system 10 may be sorted by every block according to the amount of transaction votes obtained and registered in a list of the PoT node pool 211.

In one embodiment, blockchain accounts registered in the PoT node pool 211 may be guaranteed to receive a portion of transaction fee revenue generated in the blockchain system 10 as compensation. A system provider who has contributed to the economy of the blockchain system 10 may receive compensation even when not elected as a block producer. Accordingly, the ecosystem of the blockchain system 10 may be further activated.

For example, P % of the total transaction fee revenue collected by the blockchain system 10 may be allocated to the PoT node pool 211. Each account registered in the PoT node pool 211 may claim on a blockchain a revenue share allocated thereto in proportion to the amount of transaction votes won by each account.

Referring to FIG. 5, the account of a Node C registered at the highest rank of the PoT node pool 211 has won transaction votes of 120B, and in proportion thereto, may claim 5% of transaction fee revenue which has been recently collected on a blockchain.

Blockchain nodes of accounts ranked at the top in the PoT node pool 211 may be elected as a block producer, and when elected as the block producer and generate a block, may further receive additional compensation (compensation for block creation).

Seed Trust Node Pool

In various embodiments, the blockchain system 10 may operate a seed trust node pool 215. Although it is possible to achieve consensus with only nodes elected in the PoT node pool 211, the security of the blockchain system 10 may become relatively weak in a situation in which there are no transactions generated on the blockchain system 10 or the number thereof is very small. In a situation in which there are many transactions generated on the blockchain system 10 and a lot of revenue of nodes (hereinafter, PoT nodes) registered in a PoT node pool is generated, it is highly likely that the PoT nodes will make efforts to act as a normal block producer and receive revenue. However, in situations in which there is almost no traction generated, the possibility of the PoT nodes being operated as a Byzantine node, such as attacking the blockchain system 10 maliciously or not operating a node server, may increase.

The seed trust node pool 215 may include nodes which may be trusted to be operated stably even in a situation in which there is no transaction generated at all. If there are nodes to be trusted in the blockchain system 10, it may be greatly helpful to the stability and reliability of the blockchain system 10.

Nodes to be included in the seed trust node pool 215 may be, for example, operated by a trusted party which issues various tokens through the blockchain system 10. The trusted party may be understood as a party which functions to support the value of an issued token by issuing a token in the blockchain system 10 and then securely holding a physical asset (for example: currency, real estate, art works, and the like) corresponding to the value of the issued tokens outside the blockchain system 10. For example, when a user with a token requests an exchange for a physical asset corresponding to the token, a trusted party may pay the user the physical asset at any time, and incinerate, on the blockchain system 10, the token corresponding to the redeemed physical asset.

In various embodiments, a trusted party may be a bank which issues tokens corresponding to legal tender, an exchange which issues tokens corresponding to cryptocurrency on external public blockchains, and various parties which issue tokens based on other physical assets.

A trusted party may operate a blockchain core node which operates stably to maintain the blockchain system 10 in which tokens issued by the trusted party are distributed. Such nodes may be registered in the seed trust node pool 215.

As an incentive for a trusted party to manage token issuance and operate a node which may be trusted, a portion of transaction fee revenue may be provided to the nodes of the seed trust node pool 215. In addition, such compensation may be viewed as compensation for serving a role of managing reserves to preserve the value of tokens issued by trust parties.

When blockchain core nodes operated by trust parties are elected as some of block producers to participate in a consensus protocol of the blockchain system 10, the stability and security of the blockchain system 10 may be further enhanced. Accordingly, blockchain users may further trust the blockchain system 10 and use services based on the blockchain system 10.

Top Trust Account

In various embodiments, the blockchain system 10 may include a top trust account. The top trust account may have the authority to manage a list of accounts to be registered in the seed trust node pool 215 and to specify a dividend ratio of transaction fees to be paid to the accounts included in the seed trust node pool 215.

For example, a top trust account may be owned by a subject with a very high level of trust in a blockchain ecosystem, such as a financial institution or a government agency. A top trust account may be set so as not to perform an operation which affects blockchain transaction processing of users apart from performing an operation according to the above-described authority. All activities of the top trust account are conducted on the blockchain system 10, and thus, are conducted in a transparent and forgery-proof manner, and may be monitored by all members of a blockchain ecosystem. For example, a top trust account may designate a trusted party as a seed trust node.

Election of Block Producer

In one embodiment, block producers of the blockchain system 10 according to the present invention may be elected from the PoT node pool 211 and the seed trust node pool 215. Therefore, nodes registered in the PoT node pool 211 and the seed trust node pool 215 may be understood as block producer candidates. The total number of elected block producers may be assumed to be N. The number of block producers of the blockchain system 10 may be limited for scalability of a blockchain. The problem of blockchain scalability addresses a problem of increasing a transaction capacity (TPS) which may be processed per second. In order to improve blockchain scalability, the number of participating nodes participating in a consensus process, such as a block producer or a validator, may be limited.

When taking another blockchain system as an example, there is no predetermined number of miner nodes in a PoW-based blockchain consensus method like Bitcoin or Ethereum, but any node having computing power to quickly find a hash puzzle may become a miner node to generate a new block. Since all nodes are given the possibility to be a block producer when generating each block, all nodes should competitively reach a consensus. Accordingly, reaching a consensus on a new block is slowed down.

For example, even in a Federated Byzantine Agreement (FBA) consensus method of a Stellar Consensus Protocol to which the concept of 'quorum-slice' is applied, the size of a quorum set of consensus participating nodes is not predetermined. As the intersections of 'quorum-slices' designating other nodes trusted by each blockchain node are gradually increased, the size of the quorum set of the consensus participating nodes may be arbitrarily increased. Since a large number of nodes of the quorum set of the consensus participating nodes should exchange messages and reach a consensus on a new block, it is difficult to guarantee a high TPS of the Stellar blockchain.

Nodes which are block producers which have been elected based on the amount of transaction votes of the blockchain system 10 may generate new blocks in a cooperative way without competing with each other, so that the blockchain system 10 may have high TPS performance.

For example, all of the top N nodes among nodes registered in the PoT node pool 211 may be elected as block producers. In this case, it may be understood that the blockchain system 10 may be stably operated only with the nodes registered in the PoT node pool 211.

For another example, the top p nodes which have won many transaction votes among the nodes in the PoT node pool 211 may be elected as block producers. The remaining N-p nodes may be elected from the seed trust node pool 215. However, the values of N and p may be real numbers greater than 0, and the values of N and p may vary depending on the situation of the block chain system 10.

In one embodiment, N-p nodes to be elected from the seed trust node pool 215 may be selected in a pseudo-randomly manner from the seed trust node pool 215. The pseudo-random manner may be understood as a method which is difficult to predict, yet, a method which may be determined by a protocol and reproducible by any node. For example, the pseudo-random method is used to generate a random number of a hash of a block. The nodes registered in the seed trust node pool 215 are all trusted, and thus, any node included therein may be generated as a block producer.

In various embodiments, the numbers N and p may be fixed on the blockchain system 10. In order to weight PoT nodes, the value of p may be typically set to be equal to or greater than a majority of N. By allowing that there are more PoT nodes than trusted seed nodes among block producers, it is possible to induce decentralized governance. The trusted seed nodes may serve as a back-up when there are a few publicly participating PoT nodes. N nodes, which are periodically re-elected from the two node pools, generate new blocks through a BFT-based consensus protocol to be described below with reference to FIG. 7.

In the blockchain system of the present invention, a portion of total transaction fee revenue collected in a corresponding block for each newly generated block may be paid as block compensation to a block producer who has generated the corresponding block. An example of distributing the transaction fee revenue will be described below with reference to FIG. 6. Although PoT nodes which have won many transaction votes may not necessarily be forced to operate a blockchain core node (operate an actual physical server) on the blockchain system 10, block compensation given to block producers could be a strong incentive for the PoT nodes to operate actual physical core node serves on a blockchain network, thereby participating in a blockchain consensus process. If a PoT node elected as a block producer by receiving a considerable amount of transaction votes is found not to operate an actual physical blockchain core node server on a network, or operate as a node causing malfunction such as server failure or maliciously attacking a blockchain, and thus, is identified as a Byzantine node, penalties such as reducing the amount of transaction votes which have been already won, confiscating a revenue share accumulated in a transaction fee revenue pool, depriving a block producer status, and the like may be given to an account of the corresponding block producer on the blockchain system 10.

Meanwhile, when the total number of elected block producers is N=3f+1, only up to f Byzantine nodes are allowed in a BFT-based consensus protocol, so that it may be basically assumed that there are no more than f Byzantine nodes among the elected block producers.

Block producers elected in the blockchain system 10 according to the present invention are either PoT nodes implementing a service based on a blockchain to generate a large amount of transactions, thereby generating revenue, or seed trust nodes operated by trusted parties receiving trust in a blockchain ecosystem, so that the probability that block producer nodes of the blockchain system 10 according to the present invention are Byzantine nodes is very low when compared to public blockchains implemented with other BFT-based consensus algorithms.

Figure 6:
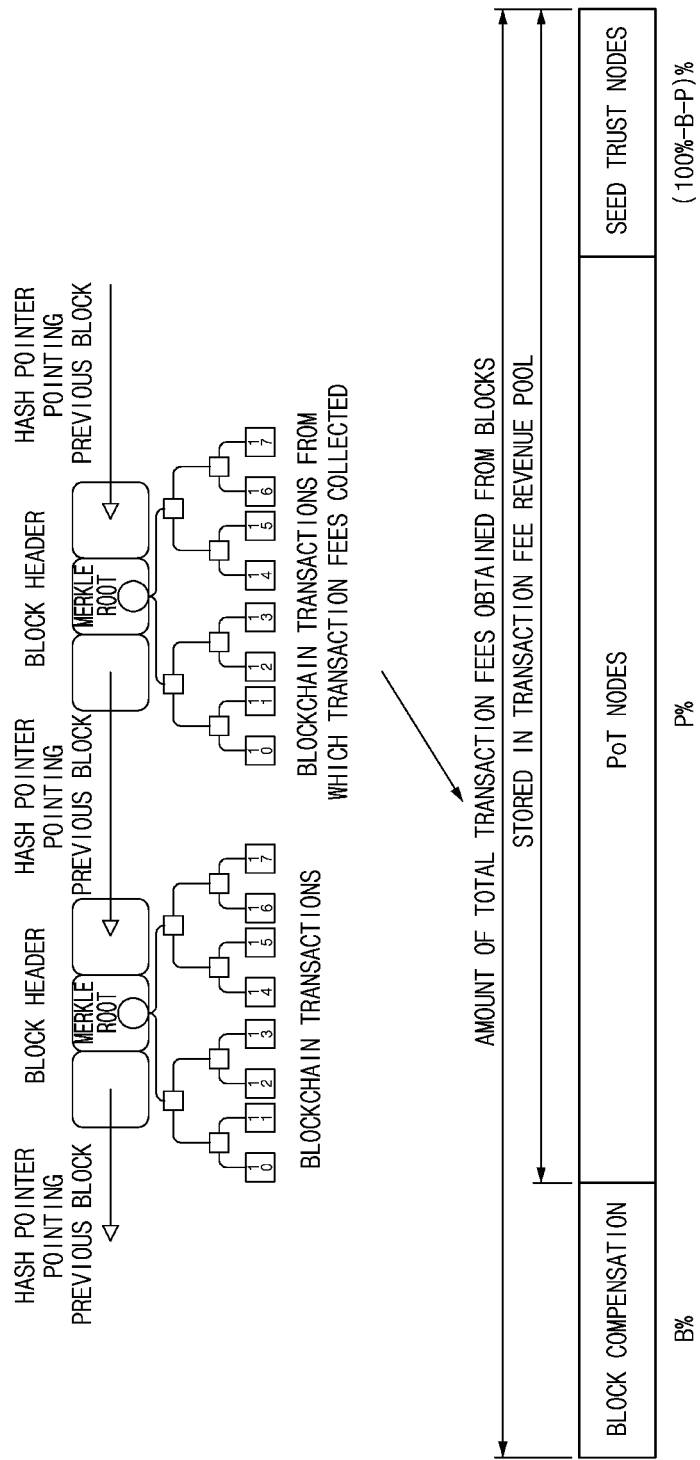
FIG. 6 is a view for describing an example of distributing transaction fee revenue in a blockchain system according to an embodiment.

FIG. 6 is a view for describing an example of distributing transaction fee revenue in a blockchain system according to an embodiment.

At least a portion of transaction fees may be paid as economic compensation for operators of the blockchain system 10. In one embodiment, the total revenue of transaction fees collected from blockchain transactions included in a block for each new block may be distributed among the block producer of the corresponding block, the nodes registered in the PoT node pool 211, and the nodes registered in the seed trust node pool 215.

Referring to FIG. 6 as an example, B %, which is the total amount of transaction fees collected in one block may be immediately given to a block producer of the corresponding block as compensation for block creation. P % may be allocated to the PoT node pool 211 and (100−B−P) % may be allocated to the seed trust node pool 215. However, B and P may be real numbers equal to 0 or greater than 0, and the values of B and P may vary depending on the situation of the blockchain system 10.

For example, the ratio value of B and P may be fixed on the blockchain system 10, in which case the ratio value of B and P may subject to change at the time of blockchain protocol upgrade (hard fork). The ratio P may typically be set to a relatively high ratio value to weight the PoT nodes.

The remaining (100−B) % excluding the block compensation may be accumulated in a transaction fee pool. Claimed fee revenue may be paid from the transaction fee pool. For example, each of the blockchain accounts registered in the PoT node pool 211 may periodically claim, from the blockchain system 10, a revenue share of each account in proportion to the collected amount of transaction votes of each account when transaction fees are collected. In the same manner, each of the blockchain accounts registered in the seed trust node pool 215 may periodically claim, from the blockchain system 10, fee revenue of each account according to a revenue share ratio of each account. The revenue share ratio may be determined by the top trust account.

Figure 7:
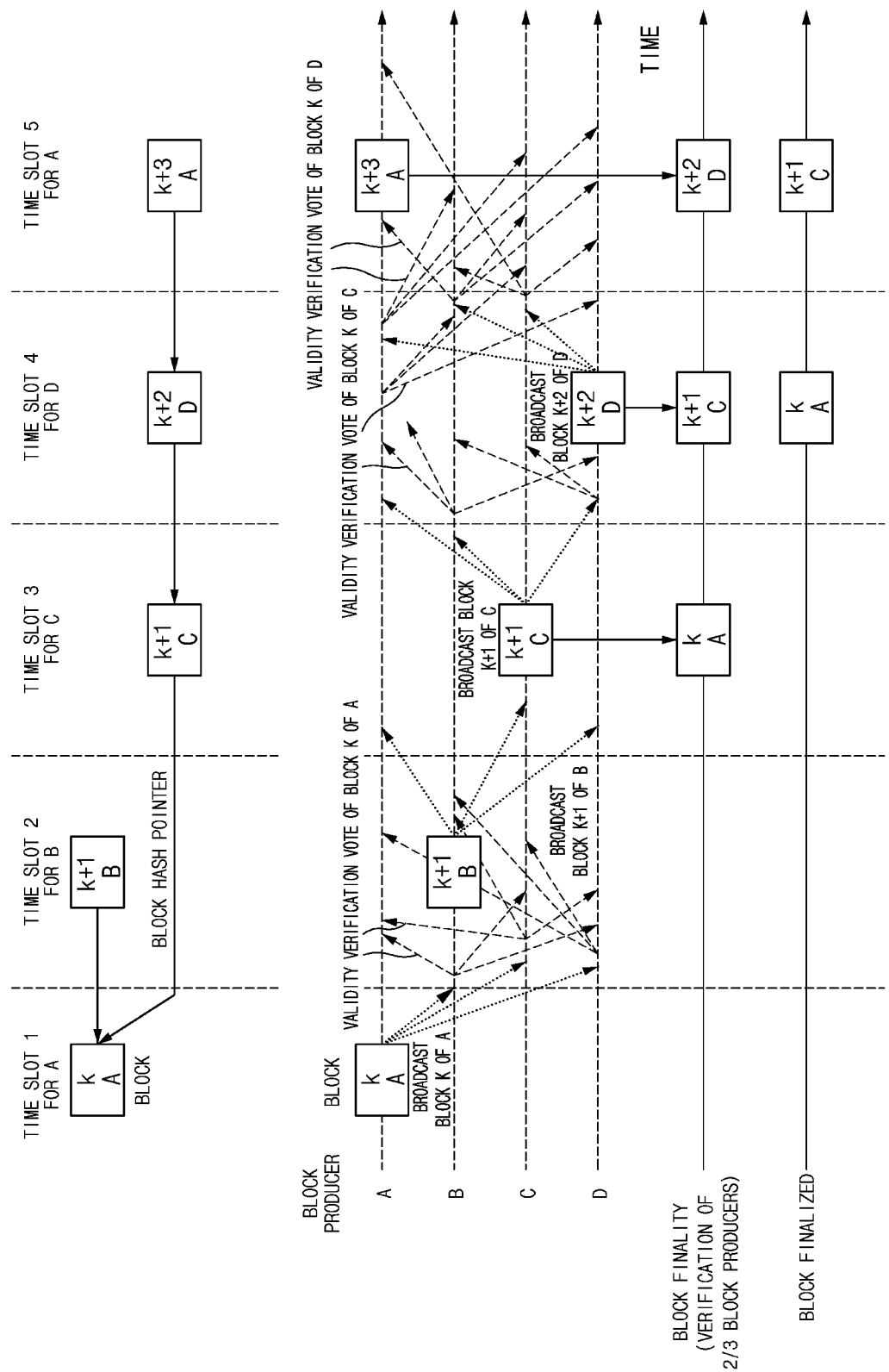
FIG. 7 is a view for describing a BFT consensus algorithm applied to a blockchain system according to an embodiment.

FIG. 7 is a view for describing a BFT consensus algorithm applied to a blockchain system according to an embodiment.

Fast transaction processing speed and high transaction throughput are key factors for the implementation of a high performance block chain. Short block time and fast block finality are necessary elements to improve the performance of the blockchain system 10. Block time is the time taken from the generation of a current block to the generation of a next block, and means the difference in generation time between successive blocks. Block finality means that a new block is irreversibly finalized. Once a block is finalized, a block which has obtained finality and all previous blocks connected to the block are guaranteed not to be subjected to a fork thereafter.

In various embodiments, the blockchain system 10 may be applied with a BFT-based consensus algorithm improved from a typical BFT-based consensus algorithm (DPos of EOS, tender mint) in order to implement short block time and fast block finality.

Block Time

Short block time on the blockchain system 10 is made possible by a fixed number of block producers generating a new block without competition. The block producers trust each other and cooperate with each other. Referring to FIG. 7, it can be assumed that four nodes A, B, C, and D are elected as block producers.

The block producers A, B, C, and D generate a new block including transactions, which have been collected by themselves, in a time slot allocated to them, and may broadcast block information generated through a 'block generation message' to all block producers. For example, in Time Slot 1 for A, A generates a block k, and may broadcast a block generation message including information about the block of A to block producers B, C, and D through the blockchain system 10.

A block producer of the next turn scheduled to generate the next block may proceed to the next new block generation turn on the basis of the most recent block received by the block producer immediately in a time slot thereof, even before a block generated by a previous block producer has finality. For example, B scheduled to generate the next block may generate Block k+1 in Time Slot 2 for B.

The latest Block k which has been generated by Block producer A allocated to the previous time slot and transferred to B is assumed that it will have finality eventually if the next block producer B has verified the validity of Block k. According to the above assumption, even when validity verification votes are not collected from more than $2/3$ of all block producers, it is possible to proceed to the next block generation step. (optimistic block production manner) However, if the next block producer does not acknowledge the validity of the previous block, a block to be newly generated by the next block producer may include a hash pointer of a block whose validity has been most recently acknowledged, skipping a wrong previous block(s).

For example, a Tendermint consensus algorithm and modified algorithms therefrom are designed to proceed to the next block generation step only when votes for the validity of a current block are collected from a majority of all participating nodes to finalize the validity of the block (pessimistic block production manner). The pessimistic block production manner may speed up time during which a generated block obtains finality, but there may be relatively long block time since it is possible to proceed to the generation of the next block only after a block is finalized by collecting votes for the validity of the block.

Meanwhile, a Byzantine node may be a malicious attacker node, or a node in which a block generated by the Byzantine node is not delivered to other block creators due to a network problem of the node. In this case, the block generated by the Byzantine node is skipped and omitted by other block producers and is not included in a canonical chain. Therefore, temporary forks may be generated in a blockchain, but eventually, the longest fork will remain as the canonical chain. For example, in FIG. 7, an example in which Block producer B is a Byzantine node is illustrated. Block k+1 generated by Block producer B is skipped by other block producers A, C, and D and excluded from a blockchain.

In another case, one block producer should not simultaneously sign two or more temporary forks. If the signature of one block producer is found in several temporary forks, it is considered a Byzantine node, so that the block producer will be penalized for economic disadvantage on the blockchain.

Block Finality

Block finality means to ensure that a corresponding block and all previous blocks connected thereto are not to be changed on a blockchain in the future. When a block obtains the cryptographic signatures of more than $2/3$ of block producers, the block is finalized. Only blocks in a temporary blockchain fork (connected after a block which has most recently obtained finality, but not yet gained the finality) have the possibility of eventually being excluded from the canonical chain. However, in s PoW-based consensus, recent blocks may be excluded at any time and a new blockchain fork may be generated, so that it is not possible to guarantee 100% finality for a block.

Fast block finality may be implemented in such a manner in which an explicit 'block validity verification vote' messages is propagated between elected block producers, apart from the propagation of a block generation message of the previous block producer. Even when a separate block validity verification voting process is not applied, the block finality of each block is eventually determined only with block generation messages. However, it may take a long time to determine the block finality.

When a block producer receives a block generation message, the block producer may verify the validity for new block information included in the block generation message and broadcast its voting information about the validity of a new block back to all other block producers.

A current block includes a block hash pointer pointing the immediately preceding block. The block hash pointer may be understood as a validity verification vote for the previous block pointed by the pointer and all previous blocks connected to the previous block. The validity verification vote is cryptographically signed by a block producer of the current block. Therefore, when more than $2/3$ of the total block producers have generated and connected new blocks on a blockchain after one block, it means that the corresponding block won cryptographically signed block validity votes from $2/3$ or more of the block producers and has finality.

Suppose that the block number of a specific block is k and the total number of block producers which may allow up to f Byzantine nodes is $N=3f+1$. When a block having a block number $k+(2f+1)-1$ is broadcast and delivered to the block producers, a block having a block number k has block finality with support of $2/3$ or more of all the block producers.

Therefore, in the example of FIG. 7, since N=4, the number of Byzantine nodes allowed is 1. In addition, Block k generated by Block producer A is to have finality when a block k+2 is delivered to block producers. Therefore, when the block k+2 of D is broadcast, Block k is to have finality at time slot 4.

Fast block finality is a key factor for the implementation of inter-blockchain communication. This is because a transaction stored in a block having finality in which there is no possibility of change due to a blockchain fork in the future can be referenced from another external blockchain system or from another sibling blockchain system in one blockchain system.

If there is no separate block validity verification voting process, the minimum time for a block to be finalized is 2f*t (t: block time). For example, if N=25 and t=3 seconds, the time taken to obtain block finality is 48 seconds. 48 seconds is a bit long to perform smooth inter-blockchain communication.

When a block generation message generated from another block producer is broadcast to a network to be delivered to each block producer, each block producer verifies the validity of a received block and broadcasts to deliver a validity verification voting message to all other block producers.

In various embodiments, for the previous block k which has not yet obtained block finality when block producer A generates a block in its time slot, when it is identified that block validity verification votes cryptographically signed by each of ⅔ or more of all block producers are collected, a block k+1 to be newly generated may include the declaration and proof data for Block k which has newly obtained finality may be broadcast to other block producers. The declaration of finality for a specific block and proof data for block finality may be referenced to information related to the finality. The information related to the finality may be included in a block generation message and broadcast to other block producers. For example, when block producer A identifies that Block k is finalized, information related to the finality of Block k may be included in a block generation message for the block k+1 and broadcast.

Additional protocols which may accelerate block validation vote message delivery may be designed. For example, when a block producer makes a block generation message and a block validity verification voting message, the block producer includes not only the cryptographic signatures of their own for a block validation vote, but also the block validity verification vote information and cryptographic signatures of other block producers about the blocks not yet having block finality, so that block validity verification voting messages may be collected fast through the fastest network path between the block producers.

In the example of FIG. 7, it can be seen that proceeding with a separate explicit block validity verification voting may allow blocks to obtain finality faster than when only a block generation message is delivered. As the total number N of block producers becomes larger, the time taken to obtain block finality through block validation voting is relatively much faster. The block validity verification voting manner as described above guarantees block finality within 1 to 2 block time in most cases.

Various embodiments of the present document and terminology used herein are not intended to limit the technical features described in the present specification to specific embodiments, but should be understood to include various changes, equivalents, or substitutes of the embodiments. With respect to the description of the drawings, similar reference numerals may be used for similar or related components. The singular form of a noun corresponding to an item may include one item or a plurality of items unless the context clearly indicates otherwise. In the present document, each of the phrases such as "A or B," "at least one of A and B," "at least one of A or B," "A, B or C," "at least one of A, B and C," and "at least one of A, B, or C" may include all possible combinations of items listed together in a corresponding phrase of the phrases. Terms such as "primary," "secondary," or "first," or "second" may be used merely to distinguish a corresponding component from other corresponding components, and do not limit the corresponding components in other aspects (for example, importance or order).

According to an embodiment, the method according to various embodiments of the present document may be included in a computer program product and provided. The computer program product may be transacted as a commodity between a seller and a buyer. The computer program product may be distributed in the form of a device-readable storage medium (for example: compact disc read only memory (CD-ROM)), or may be distributed (for example: downloaded or uploaded) directly or on-line through an application store (for example: Play Store™) or between two user devices (for example: smart phones). In the case of on-line distribution, at least a portion of the computer program product may be at least temporarily stored or temporarily generated on a device-readable storage medium such as a server of a manufacturer, a server of an application store, or a memory of a relay server.

According to various embodiments, each component (for example, a module or a program) of the above-described components may include a single or a plurality of entities. According to various embodiments, one or more of the aforementioned components or operations may be omitted, or one or more other components or operations may be added. Alternatively or additionally, a plurality of components (for example, a module or a program) may be integrated into one component. In this case, the integrated component may perform one or more functions of each component of the plurality of components the same or similar to that performed by a corresponding component of the plurality of components before the integration. According to various embodiments, operations performed by a module, program, or another component may be executed sequentially, in parallel, repeatedly, or heuristically, or one or more of the operations may be executed in a different order, omitted, or one or more other operations may be added.

The invention claimed is:

1. A blockchain system comprising a plurality of nodes communicating with each other through a distributed network and communicating with a blockchain client device outside the blockchain system, wherein:
    each of the plurality of nodes comprising:
    a processor;
    a non-transitory memory having a blockchain application stored therein, wherein the blockchain application comprises a blockchain comprising a plurality of data records, wherein the blockchain application, when executed by the processor, causes the processor to perform the steps of:
    receiving a transaction generated on the blockchain system;
    collecting a voting item;
    decoding the collected voting item;

determining that the decoding voting item comprises an account address corresponding to a specific node among the plurality of nodes;
determining a predetermined number of specific nodes among the plurality of nodes as a block producer based on collected voting items, wherein determining includes sorting the account address in order of the largest number of the collected voting items, and ranking the plurality of nodes based a sorted order;
creating an account for the determined block producer;
forwarding, to the created account of the block producer, a revenue share in a transaction fee revenue pool;
registering the predetermined number of specific nodes in a node pool based on proof of transaction and a seed trust node pool; and
generating a new block at the predetermined number of specific nodes;
wherein when the predetermined number of specific nodes (N) determined as the block producer is N=3f+1, up to f Byzantine nodes are allowed in a Byzantine Fault Tolerant (BFT)-based consensus protocol;
determining, that elected block producer is identified as a Byzantie node; and
based on a determination, that the elected block producer is identified as a Byzantie node, confiscating collected revenue share accumulated in a transaction fee revenue pool from the created account of the corresponding block producer on the blockchain system.

2. The blockchain system of claim 1, wherein each of the plurality of nodes is set to obtain a transaction fee corresponding to the transaction.

3. The blockchain system of claim 2, wherein each of the plurality of nodes is set to pay at least a portion of the obtained transaction fee to the elected block producer.

4. The blockchain system of claim 2, wherein each of the plurality of nodes is set to collect the voting item weighted in proportion to the transaction fee.

5. The blockchain system of claim 2, wherein each of the plurality of nodes is set to collect the voting item at the time of obtaining the transaction fee.

6. The blockchain system of claim 1, wherein each of the plurality of nodes is set to:
process a plurality of transactions generated on the blockchain system; and
calculate an accumulated voting amount for each of a plurality of account addresses included in the voting items based on voting items included in the plurality of transactions.

7. The blockchain system of claim 6, wherein each of the plurality of nodes is set to:
sort the plurality of account addresses in the order of the accumulated voting amount from the largest to the smallest; and
elect nodes corresponding to a predetermined number of the plurality of account addresses as the block producers.

8. The blockchain system of claim 7, wherein the nodes elected as the block producers are set to:
generate a block in a time slot allocated to each block producer; and
broadcast a block generation message associated with the generation of the block to other block producers.

9. The blockchain system of claim 8, wherein the nodes elected as the block producers are set to:
verify validity of block information included in the block generation message when receiving a block generation message from a previous block producer; and
broadcast a validity verification voting message to other block producers upon verification of the validity.

10. The blockchain system of claim 1, wherein the plurality of nodes is set to:
drive first software distributed on the blockchain system for providing first service;
process the transaction generated according to the driving of the first software; and
collect the voting item encoded by the first software to include an account address of one node operated by a provider of the first service.

11. The blockchain system of claim 1, wherein the plurality of nodes are set to elect, as a block producer, at least one candidate node predetermined as a block producer candidate on the blockchain system, among the remaining nodes other than at least one node.

12. A method performed by at least one node among a plurality of nodes included in a blockchain system and communicating with each other through a distributed network of the blockchain system,
wherein each of the plurality of nodes comprises a processor; and a non-transitory memory having a blockchain application stored therein, wherein the blockchain application comprises a blockchain comprising a plurality of data records, wherein the blockchain application, when executed by the processor, causes the processor to perform the steps of:
receiving a transaction generated on the blockchain system;
collecting a voting item;
decoding the collected voting item;
determining that the decoding voting item comprises an account address corresponding to a specific node among the plurality of nodes;
determining a predetermined number of specific nodes among the plurality of nodes as a block producer based on collected voting items, wherein determining includes sorting the account address in order of the largest number of the collected voting items, and ranking the plurality of nodes based a sorted order;
creating an account for the determined block producer;
forwarding, to the created account of the block producer, a revenue share in a transaction fee revenue pool;
registering the predetermined number of specific nodes in a node pool based on proof of transaction and a seed trust node pool; and
generating a new block at the predetermined number of specific nodes;
wherein when the predetermined number of specific nodes (N) determined as the block producer is N=3f+1, up to f Byzantine nodes are allowed in a Byzantine Fault Tolerant (BFT)-based consensus protocol;
determining, that elected block producer is identified as a Byzantie node; and
based on a determination, that the elected block producer is identified as a Byzantie node, confiscating collected revenue share accumulated in a transaction fee revenue pool from the created account of the corresponding block producer on the blockchain system.

13. The method of claim 12, wherein the collecting of the voting item further comprises:
identifying a first voting item including a first account address included in a first transaction among a plurality of transactions and collecting the first voting item as a vote for the first account address; and
identifying a second voting item including a second account address included in a second transaction among the plurality of transactions and collecting the second voting item as a vote for the second account address.

14. The method of claim 12, further comprising processing the transaction and obtaining a transaction fee corresponding to each transaction.

15. The method of claim 14, wherein the collecting of voting item is performed when the transaction fee is obtained.

16. The method of claim 14, wherein the collecting of voting item comprises collecting the voting items weighted based on the transaction fee corresponding to each of the transactions.

* * * * *